Jan. 22, 1963 S. M. BAGNO 3,075,124

CONTACT PROTECTION CIRCUIT ARRANGEMENT

Filed Sept. 23, 1958

INVENTOR.
Samuel M. Bagno
BY
Gerald Durstewitz
AGENT

United States Patent Office 3,075,124
Patented Jan. 22, 1963

3,075,124
CONTACT PROTECTION CIRCUIT ARRANGEMENT

Samuel M. Bagno, Belleville, N.J., assignor to Specialties Development Corporation, Belleville, N.J., a corporation of New Jersey Filed Sept. 23, 1958, Ser. No. 762,840
5 Claims. (Cl. 317—11)

The present invention relates to circuit makers and breakers, and, more particularly, to circuit arrangements for protecting the contacts of such devices from erosion caused by electrical arcing during the make and break operations.

Contacts which are used to make and break energized electrical circuits become eroded unless electrical arcing between the contacts during the making and breaking operations is prevented.

Several circuit arrangements have been proposed to minimize arcing between contacts; however, while these arrangements are effective during one of the contact operations, they have proved to be harmful during the other contact operation. For example, an inductance connected in series with the contacts is effective in minimizing arcing during the make contact operation but on the next break operation the field about the inductance collapses and the energy stored therein is converted into an electrical potential, increasing the energy flow between the contacts thereby causing greater arcing. Similarly, a capacitor connected across the contacts is effective in minimizing arcing during the break contact operation but causes increased arcing during the make contact operation because the capacitor charges to the line voltage when the contacts are open and discharges through the contacts as the contacts close.

Accordingly, an object of the present invention is to provide in connection with make and break circuit contacts a circuit arrangement to minimize arcing during contact operation.

Another object is to provide a circuit arrangement which minimizes arcing during one contact operation without causing an increase in arcing during the other contact operation.

A further object is to provide a circuit arrangement which minimizes arcing during both make and break contact operations.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a contact arc minimizing network for an electrical circuit including a source of power and a pair of contacts movable with respect to one another for opening and closing the circuit to the flow of electrical current therethrough, the network comprising a semiconductor device having a conducting state and a non-conducting state adapted to be connected in series with the contacts to conduct current between the contacts and the source, and means connected to the semiconductor device for changing the conductive state of the semiconductor device in response to the closing and opening of a current path through the contacts.

Figure 1:
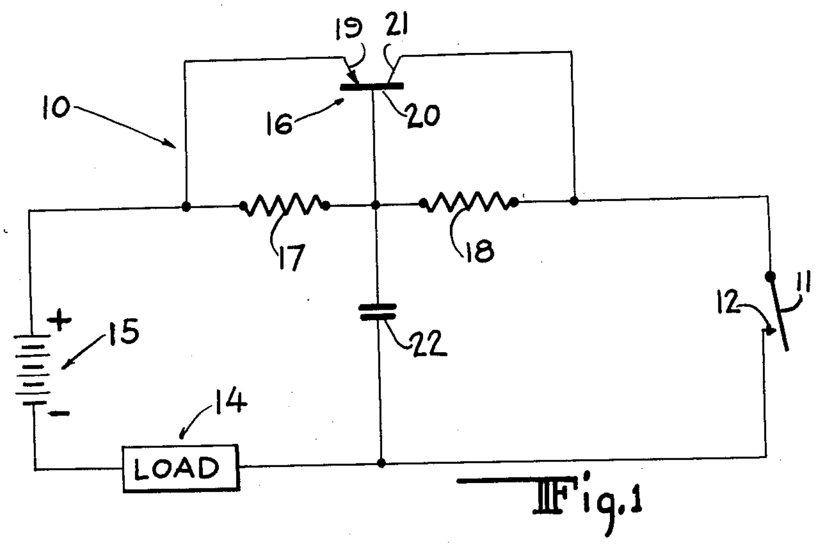
FIG. 1 is a circuit diagram of a direct current circuit including a contact protection circuit arrangement in accordance with the present invention.

Referring to FIG. 1 of the drawing in detail, there is shown a contact protection circuit arrangement which generally comprises a semiconductor network 10 connected in series with a pair of switch contacts 11 and 12, which, for the purpose of illustration, control a load energizing circuit composed of a load 14 and a source of direct current power 15.

The semiconductor network 10 includes a PNP type junction transistor 16 which preferably has a high gain at low frequencies and a low gain at high frequencies, and two resistors 17 and 18 of equal resistance. The transistor 16 has an emitter 19, a base 20, and a collector 21, and the resistors 17 and 18 are connected respectively between the emitter 19 and the base 20 and between the base 20 and the collector 21. The collector 21 is also connected to the switch contact 11, and the emitter 19 and the switch contact 12 are connected respectively to the positive and the negative sides of the load energizing circuit.

In operation, when the switch contacts 11 and 12 are open, the transistor 16 is not conducting and the voltage across the switch contacts is equal to the voltage developed by the source 15. As the contacts approach one another during the make contact operation, the electrical energy stored in the circuit will attempt to discharge through the switch thereby creating an arc between the contacts 11 and 12. Any discharge of the stored energy through the switch must be accompanied by a current flow through the resistors 17 and 18. Since current flowing through these resistors would cause the voltage across the contacts to drop, the presence of these resistances in series with the contacts prevent arcing during the make contact operation.

Upon the closing of the contacts, a current is established through the resistors 17 and 18, and these resistors divide the emiter to collector voltage to provide the necessary bias voltage at the base to place the transistor in full conduction and thus establish a low resistance connection between the closed contacts and the load energizing circuit.

Arcing between switch contacts is caused by transients produced by the make and break contact operations, and a large part of the energy in these transients is at high frequencies (about 500,000 cycles per second). The gain of transistor 16 decreases at high frequencies, therefore, during the break contact operation the transient energy is dissipated by the transistor and arcing between the contacts is further suppressed. Likewise, during the make contact operation, if some arcing should occur tending to place the transistor in conduction before the contacts have completely closed, the low gain of the transistor at the frequencies of the transients would tend to prevent the conduction thereof until the contacts have completely closed.

In order that arcing during the break contact operation may be further suppressed, the transistor 16 chosen is such that the voltages impressed across its electrodes by the load energizing circuit cause it to operate at saturation thereby building up a storage charge therein. In the case of the PNP transistor, this storage charge is caused by an excess of positive current carriers at the base, therefore, as the current in the circuit begins to decrease, due to the separation of the contacts during the break contact operation, the base tends to maintain the same positive potential with respect to the collector as existed during full conduction. The potential existing between the base and the collector under these circumstances is therefore greater than that which would exist due to the reduced current flow and has a polarity such that it opposes the potential of the source 15. It may be seen therefore that the storage charge in the transistor tends to maintain the potential across the opening contacts at some value below full potential and thereby reduces arcing between the contacts.

The arcing between contacts on the break contact operation can be still further reduced by connecting a capacitor 22 between the switch contact 12 and the junction of resistors 17 and 18.

When the contacts are closed, the capacitor 22 is charged to the voltage drop across resistance 18, and, as the contacts open, it charges to the voltage of the direct current source 15 thereby reducing the current flow through the contacts during the break contact operation. During the make contact operation, the capacitor discharges through the resistance 18 which limits the discharging current to a value which will not cause arcing between the contacts.

Figure 2:
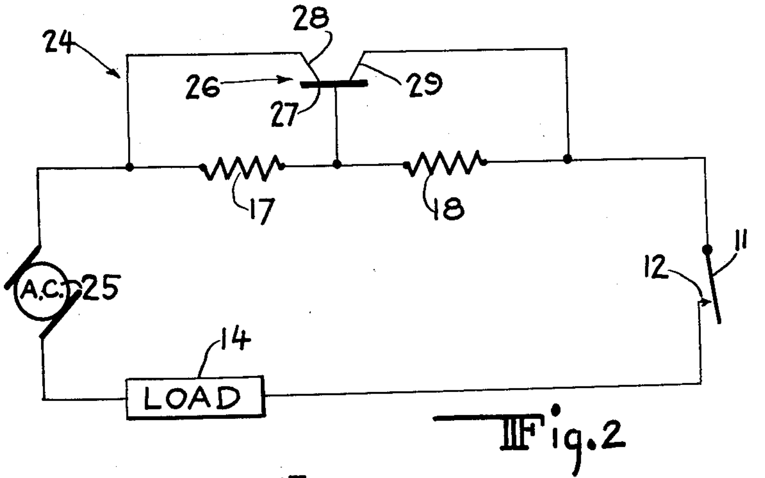
FIG. 2 is a circuit diagram of an alternating current circuit including a modified contact protection circuit arrangement.

In FIG. 2 there is shown a modified semiconductor network 24 for protecting a pair of switch contacts 11 and 12 which control an alternating current load energizing circuit comprising, for the purpose of illustration, a load 14 and a source of alternating current 25. The semiconductor network 24 is identical to the network 10 shown in FIG. 1, except that a symmetrical transistor 26 having a base 27 and electrodes 28 and 29 has been substituted for the conventional transistor 16. The transistor 26 is so constructed that each of its electrodes 28 and 29 will operate as either an emitter or a collector with equal efficiency and will therefore pass alternating current since the conductive direction of the transistor changes with the polarity of the voltages impressed thereon.

The operation of the semiconductor network 24 is essentially the same as that of the network 10 except that the transistor 26, because of its symmetry, provides a low resistance alternating current path between the contacts and the load energizing circuit after the contacts have closed.

Figure 3:
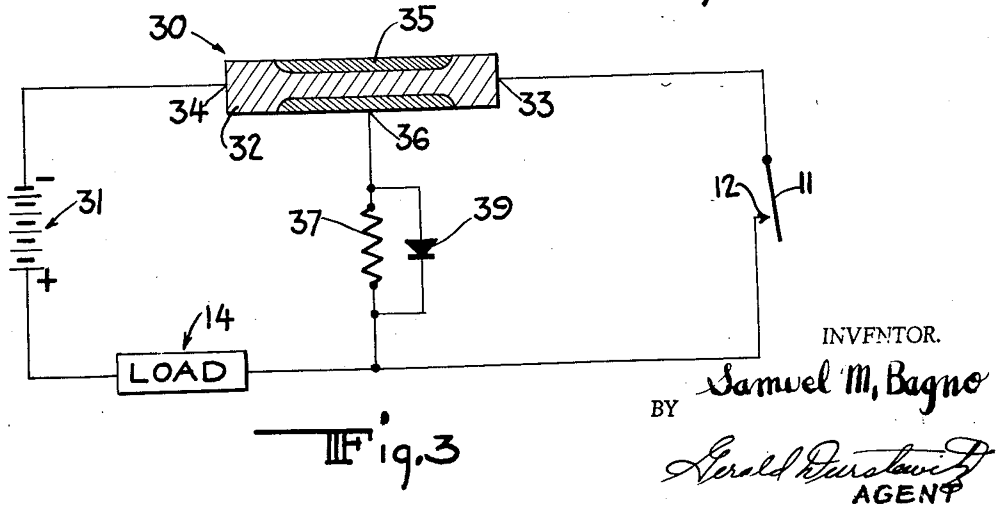
FIG. 3 is a circuit diagram of a direct current circuit including another modified contact protection circuit arrangement.

Another contact protection arrangement is shown in shown in FIG. 3 in which a field-effect transistor 30 is used to protect switch contacts 11 and 12 which control a load energizing direct current circuit including a load 14 and a direct current source 31. The field-effect transistor 30 includes a "p" type bar 32 having a source electrode 33 and a drain electrode 34, and a "n" type belt 35 surrounding the bar 32 and having a gate electrode 36. The source electrode 33 is connected to the switch contact 11 and the gate electrode 36 is connected to the switch contact 12 through a resistor 37 having a rectifier 39 connected in parallel therewith. The drain electrode 34 and the switch contact 12 are respectively connected to the negative and positive side of the load energizing circuit.

In operation, when the contacts 11 and 12 are open, a positive charge is placed on the "n" type belt 35 through the gate electrode 36 and a negative charge is placed on the "p" type bar 32 through the drain electrode 34. The difference in potential between the belt 35 and the bar 32 causes the belt to diffuse into the bar, decreasing the conductivity of the bar between the source electrode 33 and the drain electrode 34. When the contacts close, the current flow therethrough is initially limited by the decreased conductivity of the bar 32. As the charge between the belt 35 and the bar 32 discharges through the diode 39 and the contacts 11 and 12, the current flow from the source electrode 33 to the drain electrode 34 increases until the field-effect transistor 30 is in full conduction. During the break circuit operation, arcing is also suppressed because the belt 35 and the bar 32 act as the plates of a capacitor connected in parallel with the contacts and charge to the voltage of the source 31 thereby reducing the current flowing through the contacts.

From the foregoing description, it will be seen that the present invention provides contact protection circuit arrangements which will effectively minimize arcing between make and break circuit contacts.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A contact arc minimizing network for an electrical circuit including a source of power and a load and a pair of contacts movable with respect to one another for opening and closing the circuit to the flow of electrical current therethrough, said network comprising a semiconductor device having an input electrode and an output electrode adapted to be connected in series with the contacts and the load and the source to provide a path for current flow between the source and the load through the contacts and having a control electrode, and means connected to each of said electrodes for providing a second path for current flow between the source and the load through the contacts to change the potential on said control electrode in response to the closing of the contacts so that said semiconductor device is placed in conduction.

2. A contact arc minimizing network for an electrical circuit including a source of power and a pair of contacts movable with respect to one another for opening and closing the circuit to the flow of electrical current therethrough, said network comprising a semiconductor device having an input electrode and an output electrode adapted to be connected in series with the contacts to conduct current between the contacts and the source and having a control electrode, and means connected to said electrodes for providing bias to said device when the contacts are closed including a resistance element connecting said input electrode and said control electrode and a second resistance element connecting said control electrode and said output electrode.

3. A contact arc minimizing network according to claim 2 wherein one of said electrodes is adapted to be connected to one of the contacts and a capacitor is connected to the control electrode and is adapted to be connected to the other contact.

4. A contact arc minimizing network for an electrical circuit including a source of power and a pair of contacts movable with respect to one another for opening and closing the circuit to the flow of electrical current therethrough, said network comprising a semi-conductor device having an input electrode and an output electrode adapted to be connected in series with the contacts to conduct current between the contacts and the source and having a control electrode, and means connected to said control electrode for changing the conductive state of said semiconductor in response to the closing and opening of a current path through the contacts, said semiconductor device being a field effect transistor including a body portion and a belt portion surrounding said body portion, said input and output electrodes being connected to opposite ends of said body portion, and said control electrode being connected to said belt portion.

5. A contact arc minimizing network according to claim 4, wherein said belt portion is adapted to be connected to the opposite side of the contacts from said body portion.

References Cited in the file of this patent

UNITED STATES PATENTS

| | | |
|---|---|---|
| 2,476,843 | Curtis | July 19, 1949 |
| 2,592,683 | Gray | Apr. 15, 1952 |

| | | |
|---|---|---|
| 2,722,649 | Immel et al. | Nov. 1, 1955 |
| 2,759,111 | Wideroe | Aug. 14, 1956 |
| 2,802,149 | Germer et al. | Aug. 6, 1957 |
| 2,845,580 | Smith | July 29, 1958 |
| 2,864,975 | Sumner | Dec. 16, 1958 |
| 2,906,926 | Bauer | Sept. 29, 1959 |
| 2,980,826 | Horton | Apr. 18, 1961 |